United States Patent
Wong

[11] Patent Number: 5,424,783
[45] Date of Patent: Jun. 13, 1995

[54] CLUSTERING FILTER METHOD FOR NOISE FILTERING, SCALE-SPACE FILTERING AND IMAGE PROCESSING

[76] Inventor: Yiu-fai Wong, 500 N. Ynez Ave. #B, Monterey Park, Calif. 91754

[21] Appl. No.: 15,868

[22] Filed: Feb. 10, 1993

[51] Int. Cl.$^6$ .............................................. H04N 5/21
[52] U.S. Cl. ................................... 348/606; 348/607; 358/447; 382/254
[58] Field of Search ............... 358/36, 37, 166, 167, 358/447; 382/54, 11; H04N 9/64, 5/213, 5/21; 348/603, 606, 607, 625, 627, 597

[56] References Cited

U.S. PATENT DOCUMENTS

| | | | |
|---|---|---|---|
| 4,315,318 | 2/1982 | Kato | 358/447 |
| 4,485,399 | 11/1984 | Schulz | 358/36 |
| 4,571,635 | 2/1986 | Mahmoodi | 358/447 |
| 4,630,307 | 12/1986 | Cok | 382/54 |
| 4,648,120 | 3/1987 | Chittineni | 382/54 |
| 4,700,229 | 10/1987 | Herrmann | 358/447 |
| 4,734,770 | 3/1988 | Matsuba | 358/36 |
| 4,736,439 | 4/1988 | May | 382/54 |
| 4,761,819 | 8/1988 | Denison | 382/54 |
| 4,853,794 | 8/1989 | Fukumoto | 382/54 |
| 5,081,691 | 1/1992 | Chesley | 382/54 |
| 5,081,692 | 1/1992 | Kwon | 358/447 |
| 5,151,794 | 9/1992 | Kumagai | 358/447 |
| 5,196,935 | 3/1993 | Cremonesi | 358/37 |
| 5,237,524 | 8/1993 | Heinemann | 358/36 |
| 5,245,425 | 9/1993 | Klatt | 358/166 |
| 5,260,775 | 11/1993 | Farauda | 358/167 |

*Primary Examiner*—James J. Groody
*Assistant Examiner*—Chris Grant
*Attorney, Agent, or Firm*—George J. Netter

[57] ABSTRACT

A method is provided for image processing to remove noise and improve smoothing of nonimpulsive noise while preserving major identifying edges of the image, all of which are accomplished corresponding to a prescribed scale of interest. The method achieves nonlinear cluster filtering relying upon a maximum entropy principle. A single scale parameter governs filtering by dictating the spatial extent of neighboring data used for clustering. This, together with the signal characteristic (e.g., variation in gray scale) determines the scale parameter in the output space. The described method is unsupervised and data driven.

7 Claims, 6 Drawing Sheets

FIG. 2C
FIG. 5

```
                    START
                      ↓
Select spatial scale α and the region R of interest in the image
                      ↓
```

For each pixel located at $x$ in R, compute $$\bar{y} = \frac{\sum_i y_i \, e^{-\alpha \|x-x_i\|^2}}{\sum_i e^{-\alpha \|x-x_i\|^2}}$$

$$\sigma_y^2 = \frac{\sum_i (y_i - \bar{y})^2 \, e^{-\alpha \|x-x_i\|^2}}{\sum_i e^{-\alpha \|x-x_i\|^2}}$$

$$\beta = \min(24, \, 1/\sigma_y^2)$$

---

Compute $\bar{\beta}$ = the average of $\beta$ over R

Modify each $\beta$ by the formula $$\beta^* = \min(24, \, \beta(1 + \bar{\beta}/(\bar{\beta} + \beta)))$$

---

For each pixel located at $x$ in R, $$y^{(0)} = \bar{y}$$
$$\beta = \beta^*$$
$$t = 0$$

Iterate $\quad y^{(t+1)} = \dfrac{\sum_i y_i \, e^{-\alpha \|x-x_i\|^2} \, e^{-\beta(y^{(t)} - y_i)^2}}{\sum_i e^{-\alpha \|x-x_i\|^2} \, e^{-\beta(y^{(t)} - y_i)^2}}$ until it converges.

The converged $y^{(t+1)}$ becomes the filter output at $x$

FIG. 6

CLUSTERING FILTER METHOD FOR NOISE FILTERING, SCALE-SPACE FILTERING AND IMAGE PROCESSING

BACKGROUND

1. Field of the Invention

The present invention relates generally to a method for processing an image in which filtering effects noise reduction and improved smoothing while preserving edges of the image and enabling robust scale-space representation. The method can be applied to any kind of computed image having an underlying spatial or temporal domain, and also can effect reduced encoding of images.

2. Related Art

In the processing of an image an essential problem is to preserve the outline or edges of the image while at the same time removing or filtering out noise from the processing data. Whether the system is designed for either artificial vision (i.e., machine vision) or for signal processing, the essential difficulty is defining what the real signals are and, thus, the essential overall appearance of the image so as to ensure that in filtering out noise or restructuring of the image essential recognition characteristics are not lost. The distinction between "signal" and "noise" really depends on the level of description or scale one desires.

One approach taken to solving these problems in the past has been so-called Gaussian scale-space filtering, such as described in the article "Scale-space Filtering" by A. Witkin presented at the International Joint Conference Artificial Intellegence, Karlsruhe, Germany, 1983. According to this technique, a family of images are obtained by convolving an initial image $I_o$ with a Gaussian $G(x,t)$. Accordingly, we now have $I(x,t)=I_o(x)*G(x,t)$ where variance t has been interpreted as the scale parameter. Considerable interest has been shown in this technique in the computer vision community.

A technique for smoothing data termed median filtering has also been proposed in a book entitled "Exploratory Data Analysis" by J. W. Tukey published by Addison-Wesley, Massachusetts in 1977. Median filtering has been used for both speech processing and image restoration, however, it has been found that in this technique of filtering insufficient smoothing has been obtained for the handling of non-impulsive noise. A generalized form referred to as an order statistic filter (OS) has found considerable use. Still other approaches to this problem have been attempted by so-called robust estimators which have been used to produce a modified trim mean filter. L-filters and M-filters have more direct motivation from statistical techniques.

Of these several known approaches to image processing, all are not completely satisfactory in being unable to provide one or more of the desired features of a fully successful system, namely, image edge preservation, noise reduction, improved smoothing of nonimpulsive noise, and robust scale-space representation.

SUMMARY OF THE DISCLOSURE

In accordance with the practice of the present invention there is provided a method for use in image processing for effectively removing noise, preserving the edges of the image and improving smoothing of non-impulsive noise, all of which are accomplished corresponding to a given scale of interest. This is accomplished by nonlinear cluster filtering relying upon a maximum entropy principle. More particularly, for each datum in a signal (e.g., pixel of an image) a neighborhood of weighted data is utilized for clustering and the cluster center becomes the filter output. A single scale parameter governs filtering which dictates the spatial extent of the nearby data used for clustering. This latter information, together with the local characteristic of the signal (e.g., variation in gray scale, color), determines the scale parameter in the output space which, in turn, dictates the influence of these data on the output. Accordingly, this filter is completely unsupervised and data driven.

BRIEF DESCRIPTION OF THE DRAWING

FIGS. 2A, 2B and 2C show, respectively, an image of a woman's face before, after filtering and absolute difference according to the method of this invention;

FIG. 5 is a depiction of an image showing a further enhancement obtainable with this invention; and FIG. 6 depicts a function block flow diagram of the method of this invention.

DESCRIPTION OF A PREFERRED EMBODIMENT

Figure 1:
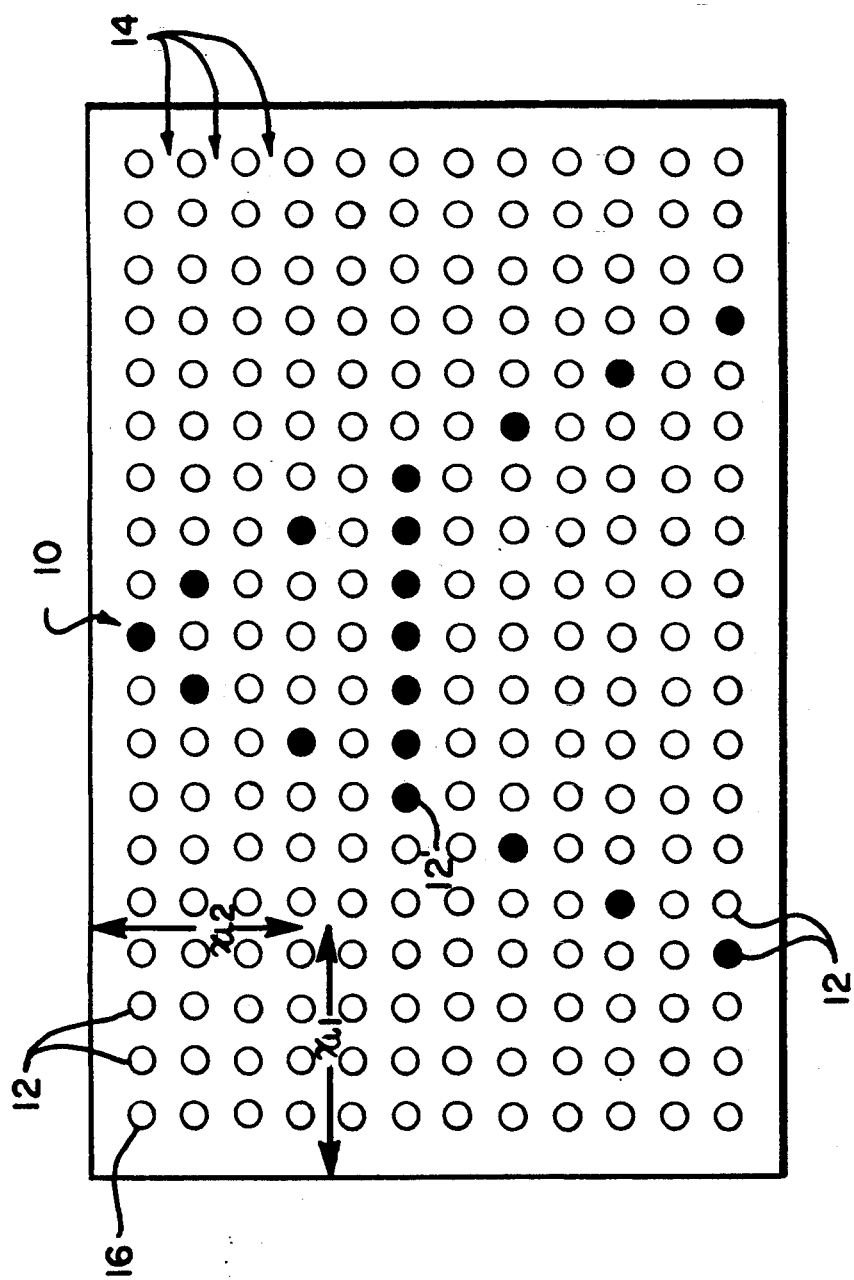
FIG. 1 is a schematic depiction of a video generated or computed image.

With reference now to the drawing and particularly FIG. 1, an image 10 of the letter "A" is presented on a video display 11. More particularly, the display is seen to be composed of a large number of pixels 12 which are uniformly spaced along a plurality of vertically spaced lines 14. The coordinates of a given pixel 12' are represented by $(x_{i1}, x_{i2})$ and the gray level characteristic value will be referred to as y. For simplicity, only a single characteristic or attribute will be used here (e.g., gray level) however, it is to be understood that there can be other attributes, such as color, or filtered outputs by passing the data through a filter bank.

Since it is well-known that the pixels are highly redundant due to spatial correlation, it is believed that the true pixel attribute y at position x can be estimated from its neighboring pixels. It is a fundamental consideration to the present invention that near neighbor data points (x,y) will provide more information at lesser cost, while the more distant neighbors will provide less information at greater cost. Or, expressed slightly differently, a more robust estimation can be obtained by utilizing information spread among neighboring data. Still further, it is basic here that the determination of y from neighboring data be treated as a probability distribution and that the best estimations will be obtained if the entropy of this distribution is maximized subject to linear cost constraints. The described method will determine estimates of each image pixel, independently.

With respect to the image 10 of FIG. 1, assume that there are a neighborhood of data $S=\{(x_i,y_i): i=1, \ldots, N\}$. With $P_i$ denoting contribution of $(x_i,y_i)$ to $(x,y)$, it is important to note that the input and output domains should be treated differently because the former is fixed and known whereas the latter is essentially environment-dependent. That is, the cost function must have two components $e_x(x_i)$ and $e_y(y_i)$. As already noted, it is a part of the described method to maximize the distribution entropy $S = -\Sigma_i P_i \log P_i$ subject to the constraints, $$\sum_i P_i e_x(x_i) = C_x, \quad \sum_i P_i e_y(y_i) = C_y$$

Application of Lagrangian multipliers provides $$P(x) = e^{-\alpha e_x(x_i) - \beta e_y(y_i)}/Z$$

where $$Z = \Sigma_i e^{\alpha e_x(x_i) - \beta e_y(y_i)}$$

For connecting to statistical mechanics, let $\beta = 1/T$ be the "inverse temperature" and Z the "partition function", and then the "free energy" is defined as $F = -1/\beta \log Z$. For a thermodynamic system the free energy is always minimized. That is, we look for the minima of F. Choosing the cost functions as $e_x(x_i) = \|x - x_i\|^2$, the squared spatial distance between x and $x_i$, and $e_y(y_i) = (y - y_i)^2$, and setting $\delta F/\delta y = 0$ it can be shown that the desired estimations are defined by the following equation:

$$y = \sum_i \frac{y_i w_i e^{-\beta(y_i - y)^2}}{\sum_i w_i e^{-\beta(y_i - y)^2}} \quad (1)$$

where $$w_i = e^{-\alpha \|x_i - x\|^2}$$

On viewing the above equation for $w_i$, it will be noted that when $\alpha = \infty$, then $w_i = 1$ when $x = x_i$, and 0 otherwise. This means every pixel is preserved. A large value $\alpha$ implies that only pixels very close to x have significantly non-zero $w_i$ values. On the other hand, a small valued $\alpha$ suggests that more neighbors of x contribute data toward making the estimate. Therefore, $\alpha$ can be considered a reliable measure of scale in the input space.

For any given value of $\alpha$, particular estimates of y are determined by solutions of equation (1). In this regard, it is instructive to note that it can be shown that $\beta$ is very similar to the scale parameter in the scale-space clustering algorithm. When $\beta = \infty$, every datum $y_i$ with nonzero $w_i$ is a solution of equation (1). Decreasing $\beta$ decreases the number of solutions. On $\beta = 0$, there is only one estimation or cluster. Therefore, $\beta$ can be considered a measure of scale in the output space.

It is also implied from equation (1) that the data $y_i$ and $w_i$ can be considered either the weight given to y or the relative multiplicity of y. Moreover, since the set ys forms a partition of the data, the described filtering method performs scale-space clustering for each pixel which can be found more particularly discussed in the thesis "Towards a Simple and Fast Learning and Classification System" by Yiu-fai Wong, California Institute of Technology, 1992. However, data used to determine clustering varies from one pixel to another because $w_i$s changes.

If desired, the dynamics involved in the merging of clusters as $\beta$ changes can be analyzed using local bifurcation techniques. Such analysis shows that for any initial y, the associated iterative map always converges, and that saddle-node bifurcation is the dominant type to occur indicating the presence of inhomogeneous spatial distribution in the data.

As previously referenced, multiple attributes or characteristics may exist, such as the case in color images. In this case, it can be shown that equation (1) now becomes, $$y(k) = \sum_i \frac{y_i(k) w_i e^{-\beta |y - y_i|^2}}{\sum_j w_j e^{-\beta |y - y_j|^2}} \quad (2)$$

where $w_i = e^{-\alpha \|x - x_i\|^2}$ and $y_i(k)$ is the $k^{th}$ attribute of $i^{th}$ pixel.

For a given $\alpha$, the particular y one obtains depends upon the solutions of equation ($\alpha$), and this requires initializing y and selecting a particular $\beta$ for each pixel.

To initialize y, we compute $$y^{(o)} = y = \Sigma_i y_i w_i / \Sigma_i w_i.$$

Then compute the variance $$\sigma_y^2 = \Sigma_i (y_i - y)^2 w_i / \Sigma_i w_i$$

which enables computing $\beta = (2\sigma_y^2)^{-1}$. In the case $\sigma_y = 0$, we can set $\beta$ to a preset maximum value such as 24 for data with values between 0 and 256.

In accordance with broadcast aspects of the invention, the method thereof includes determining at least one visible characteristic value for each image pixel, ascertaining the same characteristic values of neighboring pixels for each pixel, calculating nonlinearly weighted average pixel characteristic values from neighboring image pixels, and reconstructing a new image using the nonlinearly weighted characteristic values for each original pixel.

In practical applications of the invention full specification of the clustering filter is accomplished in this order, (1) the spatial window $\alpha$ is chosen, (2) for each pixel location, compute y, $\sigma_y^2$ and $\beta$ specified earlier herein and modify $\beta$ to $\beta^*$; (3) for every pixel, select $\beta = \beta^*$ and $y^{(o)} = y$; and (4) iterate equation (1) or (2), as the case may be, until it converges with the converged value being the filtered output.

Figure 2A:
Figure 2B:

FIG. 2A depicts an unfiltered image of a young woman and FIG. 2B shows the same image cluster filtered in accordance with the present invention with $\alpha = 0.125$. Note that considerable "noise" has been removed from the dark material on the hat and lighter portions of the hat, for example, and all without destroying any outlines or edges of larger scale in the image. FIG. 2C shows a residue image taken from FIG. 2A in which image edges are retained.

Figure 3A:
FIGS. 3A and 3B depict an image corrupted with salt-and-pepper noise and the same image after cluster filtering, respectively.
Figure 3B:

Exemplary of a different application for the described method, reference is now made to FIGS. 3A and 3B. FIG. 3A shows an image which has been rather severely corrupted by salt-and-pepper noise. FIG. 3B, the result obtained after cluster filtering the FIG. 3A image, shows the same image with substantially all of the noise removed.

Figure 4A:
FIGS. 4A–4C show, respectively, three increasingly coarse resolutions achieved by the present invention, respectively.
Figure 4B:

On occasion, it may be desirable to reduce the bit rate of an image for, say, transmission purposes. FIG. 4A shows the same image as FIG. 2A except that every other pixel has been removed by the described process. Similarly, FIG. 4B is a still coarser resolution of FIG. 4A and FIG. 4C is a still further resolution of FIG. 4B.

Figure 4C:
Figure 4D:
FIG. 4D shows the image of FIG. 4C magnified.

It is clear that the image of FIG. 4C would have an image bit rate that is far less than that of FIG. 4A and would be easier to transmit. FIG. 4D shows a magnified FIG. 4C in which the effect of removed data is apparent, although major boundaries, contours and features are still present. FIG. 4C may also be considered as an encoded image of FIG. 4A which has had its ease of transmission enhanced, and after receipt the encoded image may be substantially restored by other suitable interpolation filters.

FIG. 5 shows the image of log $\beta$: scaled to 8 bit resolution when $\beta$s are computed as described earlier with reference to FIG. 2A. This technique produces an image enhancement where very small regions of interest differ from neighboring pixels in an amount barely visible to the naked eye. For example, the two dark dots 40 and 42 were very faint light spots on the original image (FIG. 2A) image and by the application of the invention were enhanced to readily detectable spots.

The notion of scale has not been defined clearly and varies among the researchers. For present purposes, "scale" is a term that refers to the way human vision sees objects. On examining an image closely, many details are seen, while if the same image is viewed from a distance, the details are lost. However, even from a distance major features, edges or outlines can be detected which means that image boundaries have been preserved while the details ("noise") have been filtered out. Or expressed slightly differently, we can perceive sharp images as the scale increases.

In the practice of the method the images are converted to a video image or computed image and all calculations are accomplished by a programmed digital computer. It is to be understood that processing of an image in this manner will require forming pixel characteristic values into digital signals that will be stored and processed in the computer under the directions of an appropriate software program, following which the reconstructed image will be in the form of electrical signals that may be displayed in conventional manner.

Although the invention has been described in connection with a preferred embodiment, it is to be understood that those skilled in the appertaining art may make changes which come within the spirit of the disclosure and ambit of the appended claims.

What is claimed is:

1. A method of filtering an image to remove minor parts thereof without degrading major image identifying edges, comprising the steps of:
   determining the value of at least one visible characteristic for each pixel of the image;
   ascertaining the same characteristic values of neighboring pixels for each pixel, the spatial extent of neighboring pixels for each pixel being governed by a single scale parameter;
   calculating a solution of a nonlinear equation based upon weighted average pixel characteristic values from neighboring image pixels for each given pixel; and
   reconstructing an image representation displaying the calculated solution of neighboring nonlinearly weighted average characteristic values in place of each original pixel.

2. A method as in claim 1, in which the characteristic is a gray scale value.

3. A method as in claim 1, in which the image is in the form of a computed image and the calculating is accomplished by a programmed digital computer.

4. A method as in claim 1, in which the pixel characteristic values are weighted by $w_i = e^{-\alpha \|x_i - x\|^2}$ where $\alpha$ is a measure of scale, x represents the spatial coordinates of a given pixel and $x_i$ represents coordinates of pixels neighboring the given pixel.

5. A method as in claim 1, in which the scale parameter is determined by calculating a local characteristics near each image pixel.

6. A method of filtering an image to remove minor parts thereof without degrading major image identifying edges, comprising the steps of:
   determining the value of at least one visible characteristic for each pixel of the image;
   ascertaining the same characteristic values of neighboring pixels for each pixel;
   calculating a solution of a nonlinear equation based upon weighted average pixel characteristic values from neighboring image pixels for each given pixel including estimating nonlinearly weighted average pixel characteristic values by the following equation:

$$y = \sum_i \frac{y_i w_i e^{-\beta(y_i - y)^2}}{\sum_i w_i e^{-\beta(y_i - y)^2}} \text{; and}$$

reconstructing an image representation displaying the calculated solution of neighboring nonlinearly weighted average characteristic values in place of each original pixel.

7. A method as in claim 6, in which calculating includes iterating $$y^{(t+1)} = \sum_i \frac{y_i w_i e^{-\beta(y_i - y(t))^2}}{\sum_i w_i e^{-\beta(y_i - y(t))^2}}$$

until it converges to provide the filtered output.

* * * * *